Patented Oct. 9, 1951

2,570,462

UNITED STATES PATENT OFFICE 2,570,462

PROCESS FOR PREPARING ORGANOSILANES

Robert De Wald Lipscomb, Wilmington, Del., assignor to E. I. du Pont de Nemours & Company, Wilmington, Del., a corporation of Delaware No Drawing. Application January 30, 1948,
Serial No. 5,502

19 Claims. (Cl. 260—448.2)

This invention relates to organic compounds of silicon and more particularly to a method for their preparation.

Organohalosilanes have been prepared in the past by various methods such as by the reaction of a Grignard reagent on tetrahalosilanes, and by the reaction of halosilanes with polymerizable olefinic hydrocarbons in the presence of peroxy catalysts. The former method involves the use of the relatively expensive Grignard reagent. The latter method has certain disadvantages among which is the fact that the method using peroxy catalysts gives very small yields of the desired organohalosilanes when the reaction is carried out in metal equipment and thus is disadvantageous in commercial operations.

This invention has as an object the preparation of organohalosilanes. A further object is the provision of a new process for the preparation of organohalosilanes. Other objects will appear hereinafter.

These objects are accomplished by the following invention wherein a halosilane having at least one hydrogen on the silicon atom is heated with an organic compound having at least one non-aromatic or olefinic double bond, i. e., a double bond, aliphatic in character, between two carbons, and hydrogen on at least one of the doubly bonded carbons under the initiatory influence of an organic azo compound wherein the azo, —N=N—, group is acyclic and bonded from both of the nitrogens to different carbons.

Among these azo compounds which are effective as catalysts, or more properly as initiators, those which are particularly effective, because of their greater activity, in the reaction of halosilanes with olefinic compounds are those having both valences of the azo nitrogens (—N=N—) attached to different carbons which are non-aromatic, i. e., aliphatic or cycloaliphatic, and at least one of which is tertiary, which tertiary carbon has further attached to it through another carbon a negative radical in which radical the three remaining valences of the latter carbon are satisfied by at least one element of atomic number 7 to 8 (oxygen and/or nitrogen), i. e., the nitrile, carbonamide, and carbalkoxy groups. Carbalkoxy groups in which the alkyl group contains from one to six carbon atoms are preferred. The negative radical in general is neutral with respect to acidity, and of these neutral radicals the nitrile is preferred since the azonitriles are readily obtained and have high activity. The azo nitrogens in these initiators are acyclic (i. e., not part of a ring).

Still more preferred are the symmetrical azo compounds having two tertiary carbons, i. e., carbons attached to three other carbons, attached to the azo nitrogens, and having, as negative group attached to the tertiary carbons, the nitrile, carbonamide or carbalkoxy group, in view of the fact that they are active as catalysts at lower temperatures than the unsymmetrical compounds.

Unsaturated compounds which are especially suitable for carrying out the process of this invention are hydrocarbons having olefinic double bonds aliphatic in character, and having hydrogen on at least one of the doubly bonded carbons. Especially preferred are those acyclic, aliphatic hydrocarbons containing but one unsaturation and that olefinic, and having hydrogen on both of the doubly bonded carbons. The products obtainable by the process of this invention vary from condensation products of one mole of the unsaturated compound with one mole of the halosilane to products built up from several moles, e. g., two, three, four, or more of the unsaturated organic compound with one mole of the halosilane, depending upon the particular reactants employed.

The process of this invention is readily carried out by heating the olefinic compound and the halosilane in the presence of a small amount of the azo catalyst, and preferably under conditions which exclude moisture and which provide agitation of the reactants. For example, a hydrocarbon having an olefinic bond, such as ethylene, 1-octene, or 1-octadecene, and a halosilane, such as trichlorosilane, are heated under anhydrous conditions with from 0.1% to 5% by weight of the azo catalyst. The reaction temperature employed depends on the particular azo catalyst being used since the temperature at which the reaction takes place depends entirely on the temperature at which the azo compound decomposes, this being generally from about 40° C. up to about 120° C. or higher. The reaction is continued for a period of time sufficient nearly to complete the decomposition of the particular azo compound being used. Usually periods of time ranging from about one to seventeen hours at temperatures of 45° to 115° C. are sufficient. Longer times can be used but they are ordinarily not necessary. At the completion of the reaction any unreacted volatile ingredients are separated from the reaction product, for example, by distillation. The resulting addition product can be used directly in those applications where a small amount of the azo catalyst or catalyst residue contained in it is not harmful. If a product of higher quality is desired, the crude addition product can be purified by fractional distillation at ordinary or reduced pressure, or by other conventional methods.

The reaction can be carried out in glass or metal reaction vessels equipped with suitable means for agitating the reaction mixture, at substantially atmospheric or at elevated pressures, the particular pressure selected being dependent on the particular olefinic compound being used and on the particular type of product desired. Various materials of construction can be employed for the reactors; stainless steel or silver- or glass-lined steel reactors are very suitable, especially for reactions under high pressures. When the olefinic compound is a liquid at ordinary or only moderately elevated temperatures, the process of this invention is conveniently carried out at reflux temperature under a slight additional pressure of an inert gas such as nitrogen to increase the reaction temperature to the point where the catalyst is most active. Pressures of 50–760 mm. of mercury are suitable for this purpose. When gaseous olefinic compounds are employed, e. g., ethylene, the reaction can be carried out in metal reactors capable of withstanding the desired operating pressures, which can vary from 100 lb./sq. in. up to 1000 atm. or more. The lower pressures in this range, e. g., 100–1000 lb./sq. in., are used when it is desired to prepare a product having a molar ratio of one ethylene to one halosilane. When products containing several moles of ethylene to one mole of halosilane are desired, higher pressures, e. g., 1000 atm., are employed. Conventional means for agitating chemical reaction mixtures, such as mechanical stirrers inside the reaction vessel, or means for shaking or rocking the entire reactor, are suitable.

The process of this invention is further illustrated by the following examples in which proportions of ingredients are expressed in parts by weight unless otherwise noted.

Example I

A solution of 50 parts of trichlorosilane, 0.5 part of alpha,alpha' - azobis(alpha,gamma - dimethylvaleronitrile), and 2.0 parts of alpha,alpha' - azodiisobutyronitrile is placed in a stainless steel pressure reactor and ethylene added until the pressure reaches 400 lb./sq. in. The reaction mixture is heated, with agitation, to a temperature of 65°–90° C. for a period of six hours with ethylene being added at intervals during this time to maintain an internal pressure of 360–400 lb./sq. in. At the end of this reaction period the reactor is cooled and the excess ethylene bled off. The reaction mixture is then distilled, and after excess trichlorosilane is recovered, 21.8 parts of ethyltrichlorosilane boiling at 97–99° C. is obtained. This corresponds to a yield of 36%.

Example II

A reaction is carried out in a manner similar to that of Example I except that the catalyst is a mixture of one part of alpha,alpha'-azodiisobutyronitrile and one part of 1,1'-azodicyclohexanecarbonitrile, and the reaction is carried out under ethylene pressure of 350–440 lb./sq. in. at a temperature ranging from 75° to 120° C. for a period of 13 hours. Under these conditions, 29.7 parts of ethyltrichlorosilane, corresponding to a yield of 50% of the theoretical, is obtained. There is also obtained 3.5 parts of a liquid boiling at 99–136° C. which contains some of the reaction product of two moles of ethylene with one mole of trichlorosilane.

Example III

A solution of 10 parts of 1-octene, 75 parts of trichlorosilane, 1.5 parts of alpha,alpha'-azobis(alpha,gamma-dimethylvaleronitrile), and 0.5 part of alpha,alpha'-azobis(alpha-isobutyl-gamma-methylvaleronitrile) is placed in a glass reaction vessel equipped with a condenser, and the apparatus is flushed out with nitrogen. The solution is then heated until it refluxes under a nitrogen pressure of about 50 cm. of mercury above atmospheric pressure. Heating is continued for 15 hours under these conditions during which time the reaction temperature increases gradually from 42° to 55° C. The reaction mixture is then distilled, and, after recovering unchanged reactants, there is obtained 10 parts of octyltrichlorosilane, B. P. 144–149° C./66 mm. This represents a 75% yield based on unrecovered 1-octene.

Example IV

A solution of 76 parts of trichlorosilane, 70 parts of 1-octadecene, 2 parts of alpha,alpha'-azodiisobutyronitrile, and 1 part of 1,1'-azodicyclohexanecarbonitrile is placed in a stainless steel pressure reactor. During a 12-hour period the temperature of the reaction vessel is raised gradually to 115° C., after which the reaction mixture is cooled, and the resulting slightly yellow, viscous liquid reaction mixture is subjected to distillation, during which the excess trichlorosilane is removed. The residue of octadecyltrichlorosilane amounts to 113.1 parts, this corresponding to a yield of 98% of the theoretical. This product has surface-active properties, and is easily hydrolyzed by water to a solid which is highly water repellent.

Example V

A stainless steel pressure reactor is charged with 17.5 parts of butadiene, 41.5 parts of trichlorosilane, 1 part of alpha,alpha'-azodiisobutyronitrile, and 0.5 part of 1,1'-azodicyclohexanecarbonitrile and heated to 65° C. during about 1¾ hours. The temperature is then gradually raised to 115° C. during 14 hours, after which the reaction vessel is cooled and the reaction mixture distilled. After recovering unchanged butadiene and trichlorosilane, there is obtained a residue, amounting to 10 parts, of a moderately viscous yellow oil. This product is sensitive toward hydrolysis and analysis indicates that it is an addition product of 7 to 8 moles of butadiene per mole of trichlorosilane.

Analysis:
   Calculated for $(C_4H_6)_7SiHCl_3$: Si, 5.4%; Cl, 20.7%
                $(C_4H_6)_8SiHCl_3$: Si, 4.9%; Cl, 18.8%
   Found: Si, 4.8%; Cl, 19.6%

Example VI

A pressure reactor is charged with a solution of 20 parts of styrene, 75 parts of trichlorosilane, 0.5 parts of alpha,alpha'-azodiisobutyronitrile, and 0.5 part of 1,1'-azodicyclohexanecarbonitrile and the temperature raised to 80° C. in 37 minutes. During a 10 hour period the temperature is then increased gradually to 105° C., after which the reactor is cooled. The reaction mixture is distilled to remove unreacted trichlorosilane, after which there is obtained 27.3 parts of a high boiling, yellow, slightly viscous liquid residue. Analysis of this residue indicates that it is an addition product containing about four moles of styrene per mole of trichlorosilane.

Analysis:
Calculated for C₈H₉SiHCl₃: Si, 11.7%; Cl, 44.4%
(C₈H₉)₄SiHCl₃: Si, 5.1%; Cl, 19.3%
Found: Si, 4.9%; Cl, 20.5%

When a small portion of the liquid residue is added to water it partially solidifies to a pasty mass which is nearly completely soluble in ether. The resulting ether solution is flowed onto a glass plate, and evaporation of the solvent leaves a colorless brittle film.

Example VII

A mixture of 40 parts of 4-methyl-2-pentene, 70 parts of trichlorosilane and 2.0 parts of 1,1'-azodicyclohexanecarbonitrile is placed in a stainless steel reaction vessel capable of withstanding high pressure. The reactor is flushed out with dry nitrogen, closed, and heated, with agitation, at 90° to 115° C. for 11 hours. After cooling, the reaction vessel is opened, and the contents fractionally distilled. There is obtained 76 parts, corresponding to 71% of the theoretical, of a product boiling at 177–184° C. at atmospheric pressure, a mixture of the two isomeric 1:1 addition products possible, 1-ethyl-2-methylpropyltrichlorosilane and 1,3-dimethylbutyltrichlorosilane. Analysis (calculated for C₆H₁₃SiCl₃): C, 32.8%; H, 5.9%; Si, 12.8%. Found: C, 33.1%; H, 6.2%; Si, 12.5%.

Example VIII

A solution of 80 parts of benzene, 50 parts of trichlorosilane, and one part of 1,1'-azodicyclohexanecarbonitrile is placed in a silver-lined steel reactor, and ethylene injected to a pressure of 500 atm. The temperature of the mixture is raised to 100° C. and additional ethylene is injected until the pressure reaches 1000 atm. Ethylene is absorbed quite rapidly at first, and the pressure is maintained at 1000 atm. by intermittent addition of more ethylene. After 12 hours under these conditions, the reactor is cooled, excess ethylene vented, and the reaction mixture distilled. No trichlorosilane, and only a trace of the 1:1 addition product, are obtained. There are isolated 13 parts of the addition product of two moles of ethylene to one mole of trichlorosilane, boiling at 46–52° C./17 mm.; 9 parts of the 3:1 addition product, boiling at 80–85° C./17 mm.; 4 parts of the 4:1 addition product, boiling at 90–97° C./5 mm.; 20 parts of a liquid addition product of more than four moles of ethylene to one mole of trichlorosilane, boiling at 97–200° C./5 mm.; and 15 parts of a solid residue, having a still higher ratio of ethylene to trichlorosilane.

Example IX

A mixture of 20 parts of 2,4,4-trimethyl-1-pentene, 81 parts of trichlorosilane, 2 parts of alpha,alpha'-azobis-(alpha,-gamma-dimethylvaleronitrile), and one part of alpha,alpha'-azodiisobutyronitrile is heated for 12 hours at 60–65° C. by the procedure of Example III. The reaction mixture is then distilled and there is obtained 13 parts, corresponding to 30% of the theoretical, of 2,4,4-trimethylpentyltrichlorosilane, boiling at 40° C. at 2 mm.

Analysis: Calculated for C₈H₁₇SiCl₃: Si, 11.35%; Cl, 42.8%. Found: Si, 10.7%, 10.96%; Cl, 39.47%, 39.41%.

In addition to the specific reactions illustrated by the above examples, the process of this invention is applicable to the addition of other halosilanes, having one silicon atom to which are joined a hydrogen atom and a halogen atom (including fluorine, chlorine, bromine, and iodine), any other substituents on this silicon atom being monovalent hydrocarbon radicals free from non-aromatic unsaturation, to other organic compounds containing at least one olefinic double bond of aliphatic character. The operable halosilanes include the mono- and dialkyl- and mono- and diarylhalosilanes having one to three halogen atoms and one to three hydrogen atoms attached to silicon. Specific halosilanes which can be used include H₂SiCl₂, HSiBr₃, HSiF₃, H₂SiI₂, H₃SiCl, C₂H₅HSiCl₂, (CH₃)₂HSiCl, C₆H₅HSiCl₂, (C₆H₅)₂HSiCl, and the like.

The unsaturated compounds operable in the process of this invention are those having at least one non-aromatic or olefinic double bond, i. e., a double bond aliphatic in character, including aliphatic and cycloaliphatic, between two carbons, and hydrogen on at least one of the doubly bonded carbons. Monolefinic acyclic aliphatic hydrocarbons having from 2 to 18 carbon atoms are especially suitable; but high polymeric olefinic hydrocarbons such as rubber and polybutadiene can be used. Specific examples of other olefinic compounds which can be used include hydrocarbons such as propylene, 1-butene, iso-butylene, isoprene, 2-butene, cyclohexane, cyclohexadiene; olefinic esters such as allyl acetate, vinyl acetate, methyl methacrylate, 2-furyl acrylate and linseed oil; heterocyclic compounds such as vinylpyridine; olefinic halides such as vinyl chloride and allyl chloride; and olefinic alcohols such as allyl alcohol.

The relative proportions of the olefinic compound and the halosilane used in the practice of this invention can be varied widely, the preferred proportions depending in part on the type of olefinic compound being employed. In the case of nonpolymerizable olefinic compounds, e. g., octadecene, stoichiometric proportions can be used if desired, but since an excess of trichlorosilane tends to minimize side reactions, and since an excess of the halosilane is readily recovered, it is preferred to use an excess of the halosilane. In such cases a moderate excess such as 50% excess is suitable. With the polymerizable olefinic compounds, however, a larger excess of the halosilane is preferred in order to minimize telomer formation. For example, with compounds such as styrene, a 200% excess is preferred when low molecular weight telomers are desired. Smaller proportions of the halosilane, even amounts less than those stoichiometrically equivalent to the olefinic compound will add to the double bond of the olefinic compound, but the yield of 1:1 addition product will be lower.

The examples have illustrated the use of certain azo compounds and mixtures of these as catalysts, or initiators, in the process of this invention. Although single azo compounds of the type defined above are effective in this process, it is often advantageous to use mixtures of two azo compounds which decompose at different temperatures since this provides a more gradual and smoother reaction. Thus, the particular azo compound which decomposes at the lower temperature catalyzes the addition of the halosilane to the olefinic compound during the first part of the reaction at the lower temperature, and the more stable azo compound then catalyzes the addition during the later stages of the reaction at the higher temperatures. This is a convenient way of providing catalytic activity over a longer period of time to increase the yield of desired products. In addition to the specific azo compounds illustrated in the example, which are symmetrical azo compounds wherein the valences of the acyclic azo, —N=N—, group are each attached to a monovalent radical, aliphatic in character, which is saturated hydrocarbon except for a cyano group on the alpha carbon which is tertiary, the following compounds, alone or in combination with these or other azo compounds, are operable: Dimethyl, diethyl, and dihexyl alpha,alpha'-azodiisobutyrate, alpha,alpha'-azodiisobutyramide, which azo compounds can be prepared by the process of Thiele and Heuser Ann. 290, 1–43 (1896); alpha,alpha'-azobis(alpha-methyl-gamma-carboxybutyronitrile), alpha,alpha'-azobis-(alpha-methyl-beta-methoxypropionitrile), alpha,alpha'-azobis(alpha,gamma-dimethyl - gamma-ethoxyvaleronitrile), alpha,alpha'-azobis (alpha-methyl-gamma - diethylaminobutyronitrile), alpha,alpha' - azobis(alpha - methylcaprylonitrile), alpha,alpha'-azobis(alpha-cyclopropylpropionitrile), alpha,alpha'-azobis(alpha, beta, beta-trimethylbutyronitrile), alpha,alpha'-azobis(alpha-cyclohexylpropionitrile), alpha,alpha'-azobis(alpha-phenylpropionitrile), the polymeric azonitrile from 2,15-cetanedione having the formula

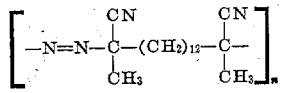

which azo compounds can be prepared by the process of Alderson and Robertson, Serial No. 736,586; 1,1' - azodicyclopentanecarbonitrile, which can be prepared by the process of Hartmann, Rec. trav. chim. 46, 150–153 (1927); Chem. weekblad 23, 77–78, January 1926; carbamylazoisobutyramide, carbamylazo - alpha,gamma-dimethylvaleramide, carbamylazohexyl-alpha,gamma-dimethylvalerate, and alpha-(carbamylazo)-isobutyronitrile which azo compounds can be prepared by the process of Robertson Serial No. 757,683—an improvement over the process of Thiele and Stange, Ann. 283, 33–37 (1894). The proportions of these operable azo compounds range from 0.01% to 10% of the weight of the reactants. However, they are usually employed in amounts ranging from about 0.5% to about 3% of the weight of the reactants.

These azo compounds may be prepared by the general procedures described by Thiele and Stange, Ann. 283, 33–37 (1894); Robertson Serial No. 757,683, filed June 27, 1947; Thiele and Heuser, Ann. 290, 1–43 (1896); Hartmann, Rec. trav. chim. 46, 150–153 (1927); Chem. weekblad 23, 77–78, January 1926; Dox, J. A. C. S. 47, 1471–1477 (1925); and Alderson and Robertson Serial No. 736, 586, filed March 22, 1947. In the process of Alderson and Robertson Serial No. 736,586 the azine of an oxy carbonyl compound (aldehyde or ketone) of not more than 12 carbons is treated with an excess of hydrogen cyanide in a system containing not more than 50% water at room temperature or above. The resulting hydrazonitrile is then oxidized to the azonitrile by an oxidizing agent such as chlorine or bromine in the presence of an acid such as hydrochloric acid. In the process of Robertson Serial No. 757,683 hydrogen cyanide is added to the semicarbazone of a ketone followed by oxidation of the resulting semicarbazidonitrile with potassium permanganate. The Alderson and Robertson application Serial No. 736,586 is now U. S. Patent 2,469,358.

The superiority of the azo catalysts over peroxide type catalysts in initiating the reaction between halosilanes and unsaturated compounds in metal equipment is emphasized by the following results. When 2.0 parts of benzoyl peroxide is substituted for the mixture of azo compounds of Example I and the trichlorosilane is heated at 75° to 120° C. for 13 hours under ethylene pressure of 460–520 lbs. per sq. in. in the same type of metal reaction vessel, no ethyltrichlorosilane is obtained. Less than 4% yield of ethyltrichlorosilane is obtained when trichlorosilane and ethylene under 530–600 lbs. per sq. in. pressure are heated at 70° to 90° C. in a stainless steel reactor for 15 hours in the presence of 1.5 parts of acetyl peroxide.

In view of the wide variety of organic compounds containing at least one olefinic double bond that can be used in the process of this invention, the products obtained are useful in a wide variety of applications. For example, they are useful as intermediates. They can be converted to the corresponding siliconic acids by hydrolyzing them to remove the halogen atoms. The siliconic acids polymerize readily, and in their polymerized form they are useful as modifiers for various polymeric materials, for example as hardeners for alkyd resins.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of organosilicon compounds which comprises heating trichlorosilane with an acyclic aliphatic hydrocarbon containing but one unsaturation and that olefinic and having hydrogen on doubly bonded carbons in the presence of a symmetrical azo compound wherein the valences of the acyclic azo, —N=N—, group are each attached to a monovalent radical, aliphatic in character, which is saturated hydrocarbon, except for a cyano group on the alpha carbon which carbon is tertiary.

2. Process for the preparation of organosilicon compounds which comprises heating trichlorosilane with a hydrocarbon, aliphatic in character, having an olefinic unsaturation and having hydrogen on doubly bonded carbon in the presence of a symmetrical azo compound wherein the valences of the acyclic azo, —N=N—, group are each attached to a monovalent radical, aliphatic in character, which is saturated hydrocarbon apart from a cyano group on the alpha carbon which carbon is tertiary.

3. Process for the preparation of organosilicon compounds which comprises heating trichlorosilane with a hydrocarbon having an olefinic unsaturation and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a cyano group on the alpha carbon which carbon is tertiary.

4. Process for the preparation of organosilicon compounds which comprises heating trichlorosilane with an organic compound having at least one double bond, aliphatic in character, and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a cyano group on the alpha carbon which carbon is tertiary.

5. Process for the preparation of organosilicon compounds which comprises heating trichlorosilane with an organic compound having an olefinic unsaturation and having hydrogen on olefinic doubly bonded carbon in the presence of an azo compound wherein both valences of the acyclic azo, —N=N—, group are attached to different carbons which are aliphatic in character and at least one of which is tertiary and attached to a negative radical, neutral with respect to acidity, by carbon of said radical which carbon has its three remaining valences satisfied by elements of atomic number seven to eight.

6. Process of claim 5 wherein the azo catalyst is symmetrical.

7. Process for the preparation of organosilicon compounds which comprises heating trichlorosilane with an organic compound having an olefinic unsaturation and having hydrogen on olefinic doubly bonded carbon in the presence of an azo compound wherein both valences of the acyclic azo, —N=N—, group are attached to different non-aromatic carbons, at least one of which is tertiary and is attached to carbon of a negative radical which carbon has its three remaining valences satisfied by elements of atomic number of seven to eight.

8. Process of claim 7 wherein the azo compound has both valences of the acyclic azo, —N=N—, group attached to different tertiary carbons aliphatic in character.

9. Process for the preparation of organosilicon compounds wherein a halosilane having hydrogen and halogen on the one silicon is heated with a compound having an olefinic linkage and having hydrogen on olefinic doubly bonded carbon in the presence of an azo compound wherein both valences of the acyclic azo, —N=N—, group are attached to different non-aromatic carbons, at least one of which is tertiary and is attached to carbon of a negative radical which carbon has its three remaining valences satisfied by elements of atomic number of seven to eight.

10. Process for the preparation of organosilicon compounds wherein a halosilane having hydrogen and halogen on the one silicon, any remaining valence of the silicon being bonded to monovalent radicals free from non-aromatic unsaturation is heated with a compound having an olefinic linkage and having hydrogen on olefinic doubly bonded carbon in the presence of an azo compound wherein both valences of the acyclic azo, —N=N—, group are attached to different non-aromatic carbons, at least one of which is tertiary and is attached to carbon of a negative radical which carbon has its three remaining valences satisfied by elements of atomic number of seven to eight.

11. Process for the preparation of organosilicon compounds which comprises heating trichlorosilane with an organic compound having an olefinic unsaturation and having hydrogen on olefinic doubly bonded carbon in the presence of an azo compound wherein both valences of the acyclic azo, —N=N—, group are attached to different tertiary carbons aliphatic in character and at least one of which is attached to a radical of the class consisting of the cyano, —CN, carbonamido, —CONH₂, and carbalkoxy, —COO-Alkyl, groups.

12. Process for the preparation of organosilicon compounds which comprises heating trichlorosilane with a hydrocarbon having an olefinic unsaturation and having hydrogen on olefinic doubly bonded carbon in the presence of a symmetrical azo compound wherein the valences of the acyclic azo, —N=N—, group are each attached to different tertiary carbons aliphatic in character and each of said tertiary carbons is attached to a radical of the class consisting of the cyano, —CN, carbonamido, —CONH₂, and carbalkoxy, —COO-Alkyl, groups.

13. Process for the preparation of organosilicon compounds which comprises heating a halosilane having hydrogen and halogen on the one silicon with a hydrocarbon having an olefinic unsaturation and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a cyano group on the carbon attached to the azo nitrogen which carbon is tertiary.

14. Process for the preparation of organosilicon compounds which comprises heating a halosilane having hydrogen and halogen on the one silicon with a hydrocarbon having an olefinic unsaturation and having hydrogen on olefinic doubly bonded carbon in the presence of a symmetrical azo compound wherein the valences of the acyclic azo, —N=N—, group are each attached to different tertiary carbons aliphatic in character and each of said tertiary carbons is attached to a radical of the class consisting of the cyano, —CN, carbonamido, —CONH₂, carbalkoxy, —COO-Alkyl, groups.

15. Process for the preparation of organosilicon compounds which comprises heating an inorganic halosilane having hydrogen and halogen on the one silicon with a hydrocarbon having an olefinic unsaturation and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a cyano group on the alpha carbon which carbon is tertiary.

16. Process for the preparation of organosilcon compounds which comprises heating an inorganic halosilane having hydrogen and halogen on the one silicon with an organic compound having at least one double bond, aliphatic in character, and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a cyano group on the alpha carbon which carbon is tertiary.

17. Process for the preparation of organosilicon compounds which comprises heating a halosilane having hydrogen and halogen on the one silicon atom, any remaining valences of which are satisfied by monovalent hydrocarbon radicals free from non-aromatic unsaturation, with a hydrocarbon having an olefinic unsaturation and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a cyano group on the alpha carbon which carbon is tertiary.

18. Process for the preparation of organosilicon compounds which comprises heating a halosilane having hydrogen and halogen on the one silicon atom, any remaining valences of which are satisfied by monovalent hydrocarbon radicals free from non-aromatic unsaturation, with an organic compound having at least one double bond, aliphatic in character, and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a cyano group on the alpha carbon which carbon is tertiary.

19. Process for the preparation of organosilicon compounds which comprises heating trichlorosilane with a hydrocarbon having an olefinic unsaturation and having hydrogen on olefinic doubly bonded carbon in the presence of a symmetrical azo compound wherein the valences of the acyclic azo, —N=N—, group are each attached to a monovalent radical, aliphatic in character, which is saturated hydrocarbon apart from a monovalent group on the alpha, tertiary carbon which monovalent group is negative and has its free valence stemming from a carbon which has its three remaining valences satisfied by elements of atomic number of seven to eight.

ROBERT DE WALD LIPSCOMB.

REFERENCES CITED

The following references are of record in the file of this patent:

UNITED STATES PATENTS

| Number | Name | Date |
| --- | --- | --- |
| 2,379,821 | Miller | July 3, 1945 |
| 2,405,019 | Dalin | July 30, 1946 |
| 2,407,181 | Scott | Sept. 3, 1946 |
| 2,443,898 | Ellingboe | June 22, 1948 |
| 2,471,959 | Hunt | May 31, 1949 |

OTHER REFERENCES

Sommer, J. A. C. S., vol. 69 (1947), page 188.

Burkhard, J. A. C. S., vol. 69 (1947), pages 2687–2689.

Barry, J. A. C. S., vol. 69 (1947) page 2916.

Pietruza, J. A. C. S., vol. 70 (1948), pages 484–486.

Certificate of Correction

Patent No. 2,570,462 October 9, 1951

ROBERT DE WALD LIPSCOMB

It is hereby certified that error appears in the printed specification of the above numbered patent requiring correction as follows:

Column 6, line 21, for "monolefinic" read *monoolefinic*; line 28, for "cyclohexane" read *cyclohexene*; column 7, line 2, for "example" read *examples*; and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*